(12) United States Patent
Huang et al.

(10) Patent No.: US 7,704,286 B2
(45) Date of Patent: Apr. 27, 2010

(54) REACTIVE DYESTUFF COMPOSITION AND THEIR USE

(75) Inventors: Huei-Chin Huang, Taoyuan County (TW); Ya-Chi Tseng, Taoyuan County (TW)

(73) Assignee: Everlight USA, Inc., Pineville, NC (US)

( * ) Notice: Subject to any disclaimer, the term of this patent is extended or adjusted under 35 U.S.C. 154(b) by 1167 days.

(21) Appl. No.: 11/300,461

(22) Filed: Dec. 15, 2005

(65) Prior Publication Data

US 2007/0044256 A1 Mar. 1, 2007

(30) Foreign Application Priority Data

Aug. 31, 2005 (CN) .................. 2005 1 0093978

(51) Int. Cl.
*C09B 29/036* (2006.01)
*C09B 62/527* (2006.01)

(52) U.S. Cl. .................. 8/641; 8/636; 8/662; 8/638; 8/639; 528/73; 534/767; 544/83

(58) Field of Classification Search .................. 8/636, 8/662, 638, 639, 641
See application file for complete search history.

(56) References Cited

U.S. PATENT DOCUMENTS

| 5,849,887 | A | * | 12/1998 | Lehmann et al. | ............. | 534/642 |
| 7,052,521 | B2 | * | 5/2006 | Huang et al. | .................... | 8/549 |
| 7,387,647 | B2 | * | 6/2008 | Huang et al. | .................... | 8/641 |

FOREIGN PATENT DOCUMENTS

| EP | 0072557 | | 2/1983 |
| JP | 57141455 | | 9/1982 |
| JP | 57141455 | A * | 9/1982 |
| JP | 04370157 | A * | 12/1992 |

OTHER PUBLICATIONS

Abstract of JP57141455. "Reactive Monoazo Compound and Dyeing by Using the Same" Data supplied from the esp@cenet database.*
11300461-277574-EIC Search, completed by STIC on Nov. 21, 2008, dye structure search.*
English abstract of Akahori et al., accessed in Derwent, Acc. No. 1993-042634.*

* cited by examiner

*Primary Examiner*—Harold Y Pyon
*Assistant Examiner*—Katie Hammer
(74) *Attorney, Agent, or Firm*—Bacon & Thomas, PLLC

(57) ABSTRACT

A dye composition, which comprising: (a) a mono azo dye of the formula (I)

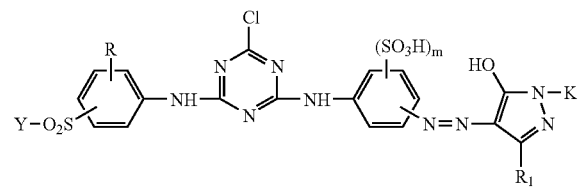

(I)

wherein R, $R_1$, K, Y and m are defined the same as the specification; and (b) at least one azo dye selected from the group consisting of the following formula (II), (III) and (IV),

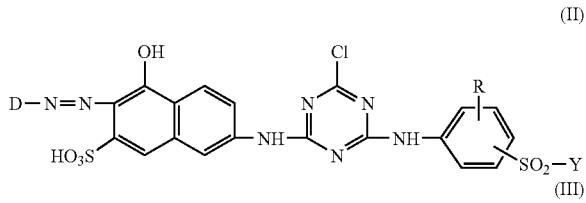

(II)

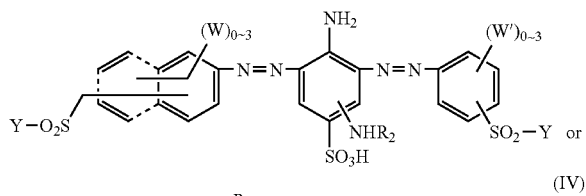

(III)

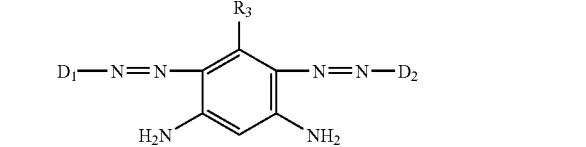

(IV)

wherein R, $R_2$, $R_3$, Y, $(W)_{0-3}$, $(W')_{0-3}$, D, $D_1$ and $D_2$ are defined the same as the specification. These kinds of dye composition with good stability and build-up. The dye composition are suitable for dyeing and printing of materials containing either cellulose fibers, such as cotton, artificial cotton, linen, and artificial linen, or synthetic polyamide, such as wool, silk, and nylon etc. Dyed materials with excellent properties can be obtained, showing especially outstanding performance in of wash-off, built-up, level-dyeing, photochromism, wet-fastnes, ghosting fastness and light fastness.

20 Claims, No Drawings

REACTIVE DYESTUFF COMPOSITION AND THEIR USE

BACKGROUND OF THE INVENTION

1. Field of the Invention

The present invention relates to dye compositions and the use thereof and, more particularly, to a yellow reactive dye composition and the use thereof on special textile finishing processes.

2. Description of Related Art

The reactive dyestuffs used for dyeing or printing cellulose fiber materials or cellulose containing fibers particularly need high quality such as the properties of leveling, reproducibility, solubility, fastness etc.

However the reactive dye stuffs available at present are short of a golden-yellow dye characterized with ordinary build-up with good color compatibility and excellent ghosting fastness. These shortcomings exposed and cannot be conquered while dyeing with pale shade and trichromatic combination. Taking yellow dyes for example, it is known that pyrazoline azo dyestuff is excellent in various fastness properties, especially light fastness and ghosting fastness. However, pyrazoline azo dyestuff is lack for build-up and color combination for it's pale shade, therefore, the conventional dyestuff shows limited color gamut while dyeing application.

With continuous efforts and attempts, the inventor of the present invention found a dye composition characterized with fine properties in ghosting fastness, compatibility, photochromism and build-up can be formed by mixing together another dyestuff with pyrazoline azo dyestuff. They are not only having superior characteristics of fastness properties, the dye compositions of the present invention are also capable of dyeing with a broad color gamut, and economic in achieving various fastness properties.

SUMMARY OF THE INVENTION

The present invention provides a dye composition, which has good dyeing properties such as ghosting fastness, color compatibility, photochromism and build-up. The dye compositions of the present invention are economic in dyeing pale shade and achieving various fastness properties as well. The dye compositions of the present invention can be mixed with conventional dyestuffs to overcome the drawbacks of build-up, compatibility, and limited color gamut, from that providing the market with a superb compatibility, ghosting fastness, build-up and photochromism combination.

The dye composition of the present invention comprising:

(a) a mono azo dye of the following formula (I) present in an amount ranging from 99% to 1% by weight relative to total weight of the composition, wherein

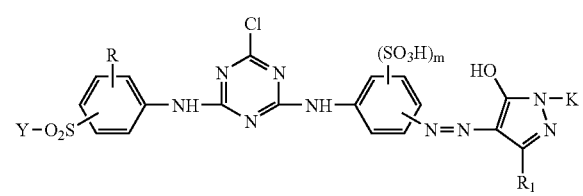
(I)

wherein
R is hydrogen, sulfo, $C_{1-4}$ alkyl or $C_{1-4}$ alkoxyl;
$R_1$ is —$CH_3$ or —COOH;
K is phenyl or naphthyl ring having 0 to 3 substituent groups, said substituent groups are selected from halogen, $C_{1-4}$ alkyl, $C_{1-4}$ alkoxyl, nitro, amino, hydroxyl, carboxyl, phosphonic acid, sulfo and —$SO_2$—Y; Y is —$CH$=$CH_2$, —$CH_2CH_2Cl$ or —$CH_2CH_2OSO_3H$; m is 1 or 2; and (b) at least one azo dye selected from the group consisting of the following formula (II), (III) and (IV) present in an amount ranging from 1% to 99% by weight relative to total weight of the composition,

(II)

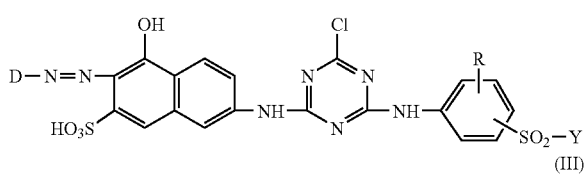
(III)

and

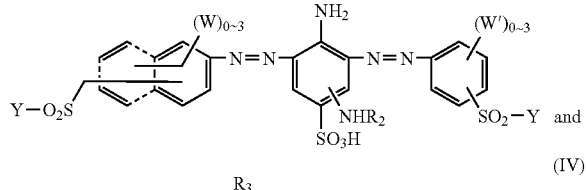
(IV)

wherein
R is hydrogen, sulfo, $C_{1-4}$ alkyl or $C_{1-4}$ alkoxyl;
$R_2$ is hydrogen, $C_{1-4}$ alkyl sulfo or $C_{1-4}$ carboxylic acid;
$R_3$ is hydrogen or carboxyl group;
Y is —$CH$=$CH_2$, —$CH_2CH_2Cl$ or —$CH_2CH_2OSO_3H$;
$(W)_{0-3}$ is 0 to 3 the same or different groups selected from the group consisting of sulfo, $C_{1-4}$ alkyl and $C_{1-4}$ alkoxyl;
$(W')_{0-3}$ is 0 to 3 the same or different groups selected from the group consisting of sulfo, $C_{1-4}$ alkyl and $C_{1-4}$ alkoxyl;
D is the following group

(Va)

or

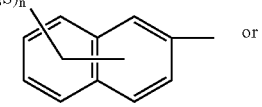
(Vb)

wherein
n is 1, 2 or 3;
o is 1 or 2.
$D_1$ and $D_2$ are independently of one another the following group of formula (VI)

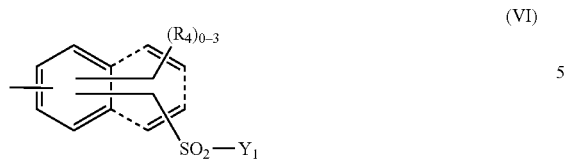

(VI)

wherein
$(R_4)_{0-3}$ is 0 to 3 the same or different groups selected from the group consisting of halogen, carboxyl, sulfo, $C_{1-4}$ alkyl and $C_{1-4}$ alkoxyl;
$Y_1$ is $-CH=CH_2$, $-CH_2CH_2Cl$ or $-CH_2CH_2OSO_3H$.

As to the component ratio of the dye composition of the present invention, preferably, wherein component (a) is present in an amount ranging from 95% to 5% by weight relative to total weight of the composition, said component (b) is present in an amount ranging from 5% to 95% by weight relative to total weight of the composition.

The compound of formula (I) of the dye composition of the present invention, preferably it is the compound of the following formula (Ia):

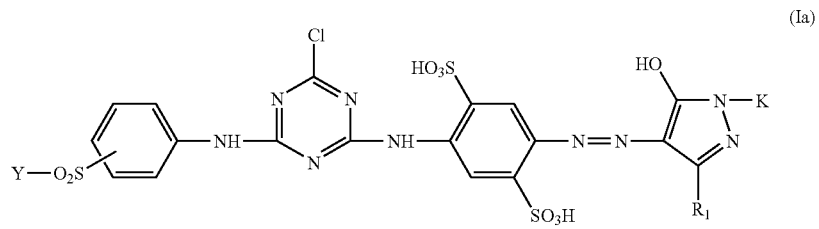

(Ia)

wherein
$R_1$ is $-CH_3$ or $-COOH$;
K is phenyl or naphthyl ring having 0 to 3 substituent groups, said substituent groups are selected from halogen, $C_{1-4}$ alkyl, $C_{1-4}$ alkoxyl, nitro, amino, hydroxyl, carboxyl, phosphonic acid, sulfo and $-SO_2-Y$;
Y is $-CH=CH_2$, $-CH_2CH_2Cl$ or $-CH_2CH_2OSO_3H$.

The compound of formula (II) of the dye composition of the present invention, preferably it is the following compound of formula (IIa):

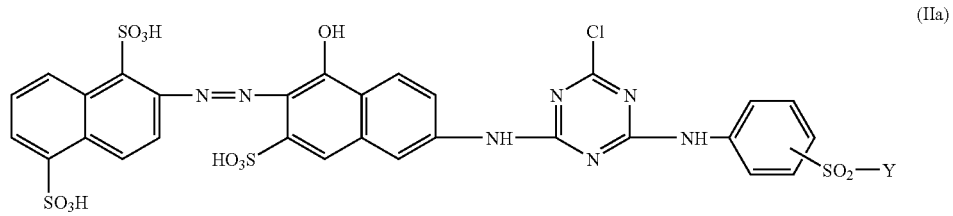

(IIa)

wherein
Y is $-CH=CH_2$, $-CH_2CH_2Cl$ or $-CH_2CH_2OSO_3H$.

The compound of formula (III) of the dye composition of the present invention, preferably it is the following compound of formula (IIIa):

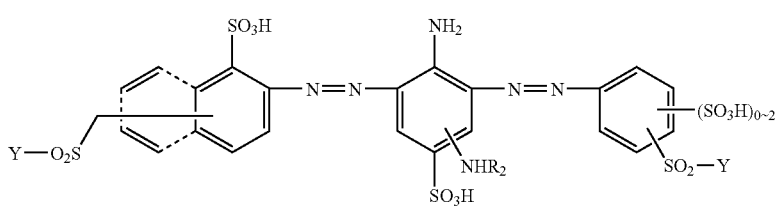

wherein
$R_2$ is hydrogen, $C_{1-4}$ alkyl sulfo or $C_{1-4}$ carboxylic acid;
Y is —CH=CH$_2$, —CH$_2$CH$_2$Cl or —CH$_2$CH$_2$OSO$_3$H.

The compound of formula (IV) of the dye composition of the present invention, preferably it is the following compound of formula (IVa);

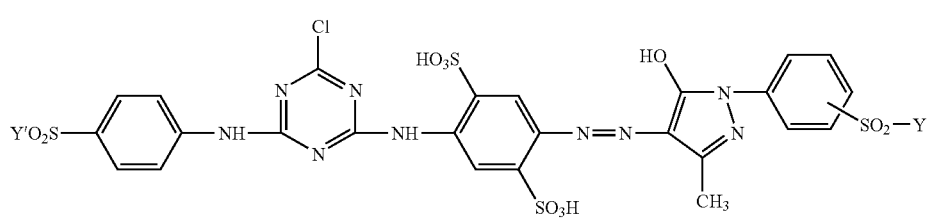

wherein
$D_1$ and $D_2$ are independently of one another the following group of formula (VI)

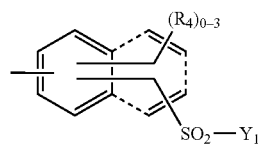

wherein $(R_4)_{0-3}$ is 0 to 3 the same or different groups selected from the group consisting of halogen, carboxyl, sulfo, $C_{1-4}$ alkyl and $C_{1-4}$ alkoxyl;
$Y_1$ is —CH=CH$_2$, —CH$_2$CH$_2$Cl or —CH$_2$CH$_2$OSO$_3$H.

The compound of formula (I) of the dye composition of the present invention, more preferably it is the following compound of formula (Ib);

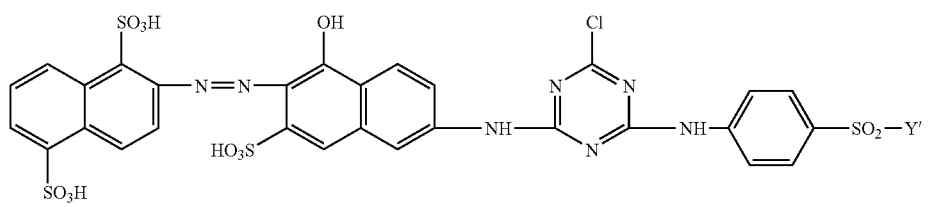

wherein
Y is —CH=CH$_2$, —CH$_2$CH$_2$Cl or —CH$_2$CH$_2$OSO$_3$H;
Y' is —CH=CH$_2$ or —CH$_2$CH$_2$OSO$_3$H.

The compound of formula (II) of the dye composition of the present invention, more preferably it is the following compound of formula (IIb);

wherein
Y' is —CH=CH$_2$ or —CH$_2$CH$_2$OSO$_3$H.

The compound of formula (III) of the dye composition of the present invention, more preferably it is the following compound of formula (IIIb);

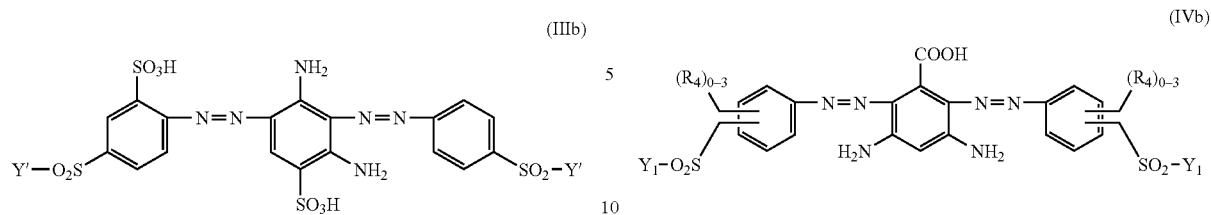

(IIIb)

wherein

Y' is —CH=CH₂ or —CH₂CH₂OSO₃H.

The compound of formula (IV) of the dye composition of the present invention, more preferably it is the following compound of formula (IVb):

(IVb)

wherein $(R_4)_{0-3}$ is 0 to 3 the same or different groups selected from the group consisting of halogen, carboxyl, sulfo, $C_{1-4}$ alkyl and $C_{1-4}$ alkoxyl;

$Y_1$ is —CH=CH₂, —CH₂CH₂Cl or —CH₂CH₂OSO₃H.

The compound of formula (I) of the dye composition of the present invention, most preferably it is the following compound of formula (I-1):

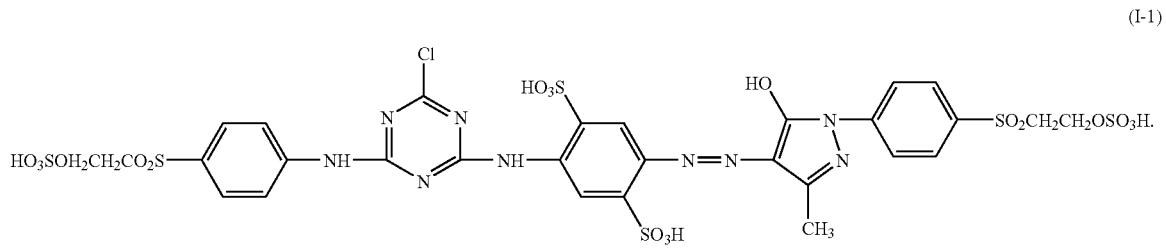

(I-1)

The compound of formula (II) of the dye composition of the present invention, most preferably it is the following compound of formula (II-1):

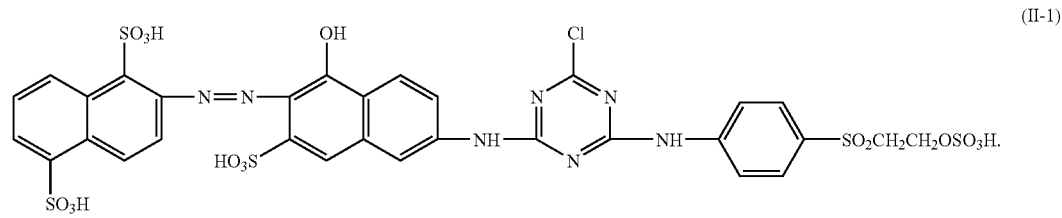

(II-1)

The compound of formula (III) of the dye composition of the present invention, most preferably it is the following compound of formula (III-1):

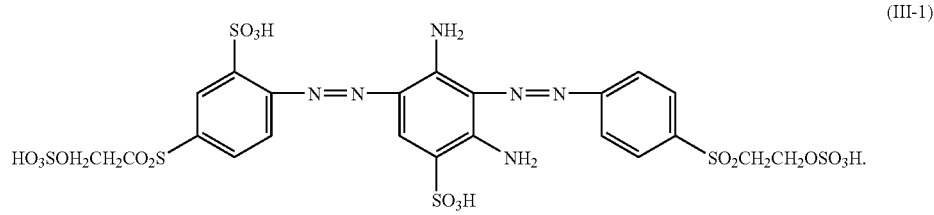

(III-1)

The compound of formula (IV) of the dye composition of the present invention, most preferably it is the following compound of formula (IV-1):

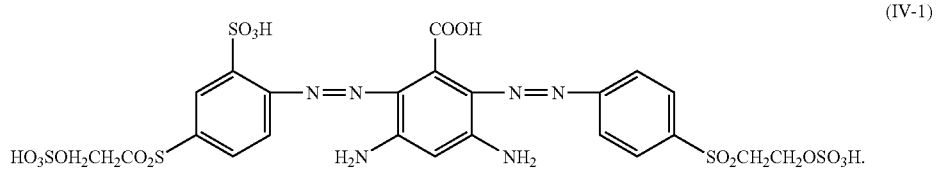
(IV-1)

The dye compositions of the present invention are suitable for dyeing materials that contain either cellulose fibers, such as cotton, artificial cotton, linen, and artificial linen, or synthetic polyamide, such as wool, silk, and nylon. Dyeing materials with dye compositions above-mentioned will achieve excellent properties, especially in build-up, color compatibility, photochromism and ghosting fastness.

The dye compositions of the present invention can be mixed with conventional dyestuffs to overcome the drawbacks of discoloring, color distortion, and compatibility, from that providing a superb ghosting fastness and photochromism combination. Where in combining with pale shades, because the practiced golden yellow components are present with redish color distortion with insufficient blue components therefore when exposed under light and carried with ghosting fastness test the hue change is relatively obvious that problems such as color distortion and discoloring are exhibited. Contrarily the dye compositions of the present invention improve the light fastness, ghosting fastness, as well as other problems such as poor dyeing compatibility and discoloration of the golden-yellow color, particularly in dyeing extremely pale shades, where when the red and/or blue dyestuffs having good light fastness and ghosting fastness are exposed under light and tested with ghosting fastness test along with the dye compositions of the present invention not only the hue demonstrates small color distortion while little discoloration are observed.

DETAILED DESCRIPTION OF THE PREFERRED EMBODIMENT

The preparation of the compound of formula (I) of the present invention is described in Taiwan Patent No. 56,934.

The preparation of the compound of formula (II) of the present invention is described in Japanese Patent laid-open No. 57-141,455.

The preparation of the compound of formula (III) of the present invention is described in U.S. Pat. No. 5,849,887.

The compound of formula (IV) of the present invention composition may be prepared by the following methods.

First, the following amino compound of formula (A) undergoes diazotization, follow up together with the following amino compound of formula (B) a coupling reaction is carried out under an acid pH (pH=1-3) and at temperatures of 10-20° C.

$D_1$—$NH_2$ (A)

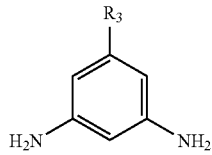
(B)

Next the diazonium salt of formula (C) amino compound is coupled with the reaction mixture under acidic to weak acidic pH such as pH of 2.0 to 5.0 and at temperatures of 10-20° C. to obtain the compound of formula (IV) of the present invention. Wherein R, $D_1$, $D_2$ are defined as above.

$D_2$-$NH_2$ (C)

Preferably the dyestuff of formula (IV) of the present invention is the azo dye of the following formula (IVa):

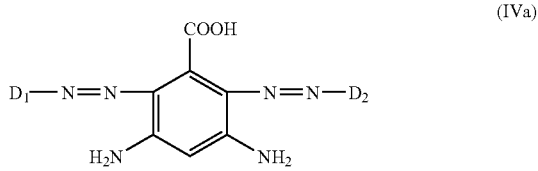
(IVa)

Wherein $D_1$ and $D_2$ are defined the same as the aforementioned. More preferably it is the azo dye of the following formula (IVb):

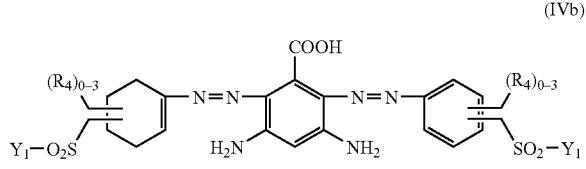
(IVb)

Wherein $(R_4)_{0-3}$ and $Y_1$ are defined the same as the aforementioned. Most preferably it is the azo dye of the following formula (IV-1).

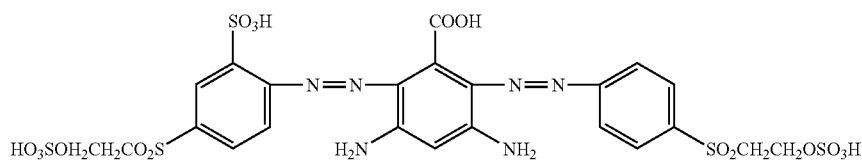

(IV-1)

With respect to the total weight of the dye compositions of the present invention, wherein the component (a) dye is present in an amount ranging from 99% to 1% by weight relative to total weight of the composition, and the component (b) dye is present in an amount ranging from 1% to 99% by weight relative to total weight of the composition. Wherein preferably, the component (a) dye is present in an amount ranging from 95% to 5% by weight relative to total weight of the composition, and the component (b) dye is present in an amount ranging from 5% to 95% by weight relative to total weight of the composition. More preferably the component (a) dye is present in an amount ranging from 90% to 10% by weight relative to total weight of the composition, and the component (b) dye is present in an amount ranging from 10% to 90% by weight relative to total weight of the composition.

The composition of the present invention can be prepared in many ways. For example by using separately prepared dye components and then mixing each dye together. The way of mixing is by using a proper mixer, for example a ball and sand grinder. In the same way, individual dye with different components can make dye liquid through stirring or through control of conditions in each dye preparation to produce an ideal mixture. In the process of dyeing or printing, separate dyes can be mixed together or mixed with other dyes.

If necessary, the dye compositions of the present invention may be contained with inorganic salts (e.g. sodium sulfate or sodium chloride), dispersants (e.g. β-naphthalene sulfonic acid-formaldehyde condensation products, methyl naphthalene sulfonic acid-formaldehyde condensation products, acetyl amino naphthol based compounds, etc.), non-dusting agents (e.g. di-2-ethylhexyl terephthalate, etc.), pH buffer agents (e.g. sodium acetate, sodium phosphate, etc.), water softeners (e.g. polyphosphate, etc.), well-known dyeing assistants, and etc.

The form of the dye compositions of the present invention is not necessary to limitation. The dye compositions of the present invention can be in the form of powders, granules or liquids.

For convenience in the statement, the compounds are expressed as free acid in the specification. When the dyestuffs of the present invention are manufactured, purified or used, they often exist in the form of water soluble salts, especially alkaline metallic salts, such as sodium salts, lithium salts, potassium salts or ammonium salts, and preferably sodium salts.

The dye compositions of the present invention can dye many kinds of fiber materials such as cellulose fiber materials and cellulose included fiber materials. These dye compositions can also be used to dye natural cellulose fibers and regenerated cellulose fibers, such as cotton, linen, jute, ramie, mucilage rayon, as well as cellulose based fibers.

The dyeing or printing of the reactive dye composition can be preceded by usual or known method. Exhaustion dyeing is applied by using usual inorganic salts (e.g. sodium sulfate and sodium chloride) and well-known acid-binding agents (e.g. sodium carbonate, sodium hydroxide). The amount of inorganic salts and alkali here is not important. Inorganic salts and alkali can be added into the dyeing bath through traditional methods either by once or by several times. In addition, dyeing assistants can be added, too. The range of dyeing temperature is from 40° C. to 90° C. Preferably, the temperature for dyeing is from 50° C. to 70° C.

In a cold-pad-batch application, dye, alkali and customary auxiliaries are padded from the liquor through. The padded, squeezed substrate is often rolled onto an A-frame and batched at room temperature to allow dye fixation to take place.

In a continuous dyeing, it can be divided into two different methods. In the one-bath padding application, dye, alkali (e.g. sodium carbonate or sodium bicarbonate) and customary auxiliaries are padded from the liquor through, the padded, squeezed substrate was then dried by either baking or steam. In the two bath padding application, the substrate is padded through a dye solution bath, pre-dried, an alkali (e.g. sodium hydroxide or sodium silicate) bath, then dye fixed by either baking or steam.

In textile printing, there can be exemplified a method which conducts printing a substrate with a printing paste containing, a well-known acid-binding agent (e.g. sodium bicarbonate), thickener, and completing the dye fixation by dry heat or steam. The dyeing or printing methods employed in the process of the present invention are not limited to these methods.

The composition of the present invention consists of good fixing capacity and very good build up capacity. Besides, the dye composition exhibits excellent color depth, level dyeing and wash off properties, as well as high solubility, high exhaustion and high fixation percentage. Therefore exhaustion dyeing can be applied under low dyeing temperature and during pad-steaming process only a short steaming time is required for the dye composition. The result has high fixation yield as well the unfixed regions can be easily washed off, mean while difference between tictorial yield and fixation yield is small, and only minor lost in soap wash can be detected.

The dye compositions of the present invention exhibit a wide range of colors and increase the dye affinity to cellulose fiber materials while dyeing or printing, and can be used in either acid or base dyeing environments. Besides, the dyed cellulose fiber materials have excellent properties of light fastness, ghosting fastness, and wet fastness, e.g. wash fastness, water fastness, seawater fastness, cross-dyeing fastness, and perspiration fastness, as well as pleating fastness, ironing fastness, and rubbing fastness. Therefore, the present invention is a valuable reactive yellow dye for cellulose fibers in the present dyeing industry. The dye compositions have the materials dyed with excellent properties and resulting outstanding build-up, photochromism, ghosting fastness and light fastness. Owing to the change of the demand of the market, the general reactive dyestuff will not meet the requirements of the extremely pale shade and mixture market any more. The dye compositions of the present invention exhibit better ghosting fastness in pale shade, and particularly demonstrating excellent compatibility, photochromism and ghosting fastness in mixture of extremely pale shade, thereby allowing this invention to fit in with the requirements and expectations of market.

For convenience in the statement, the following examples are exemplified for a more concrete description.

Many examples have been used to illustrate the present invention. The examples sited below should not be taken as a limit to the scope of the invention. In these examples, the compounds are represented in the form of dissolved acid. However, in practice, they will exist as alkali salts for mixing and salts for dyeing.

In the following examples, quantities are given as parts by weight (%) if there is no indication. The relationship between weight parts and volume parts are the same as that between kilogram and liter.

EXAMPLE 1

Preparing dyestuffs of formula (I-1) and formula (II-1) as described above. Take 90 weight parts of formula (I-1) and 10 weight parts of formula (II-1) and mixed completely to form a dye composition.

EXAMPLE 2

Preparing dyestuffs of formula (I-1) and formula (II-1) as described above. Take 75 parts of formula (I-1) and 25 parts of formula (II-1) and mixed completely to form a dye composition.

EXAMPLE 3

Preparing dyestuffs of formula (I-1) and formula (II-1) as described above. Take 60 parts of formula (I-1) and 40 parts of formula (II-1) and mixed completely to form a dye composition.

EXAMPLE 4

Preparing dyestuff of formula (I-1) and formula (III-1) as described above. Take 90 parts of formula (I-1) and 10 parts of formula (III-1) and mixed completely to form a dye composition.

EXAMPLE 5

Preparing dyestuff of formula (I-1) and formula (III-1) as described above. Take 75 parts of formula (I-1) and 25 parts of formula (III-1) and mixed completely to form a dye composition.

EXAMPLE 6

Preparing dyestuff of formula (I-1) and formula (III-1) as described above. Take 60 parts of formula (I-1) and 40 parts of formula (III-1) and mixed completely to form a dye composition.

EXAMPLE 7

Preparing dyestuff of formula (I-1) and formula (IV-1) as described above. Take 90 parts of formula (I-1) and 10 parts of formula (IV-1) and mixed completely to form a dye composition.

EXAMPLE 8

Preparing dyestuff of formula (I-1) and formula (IV-1) as described above. Take 75 parts of formula (I-1) and 25 parts of formula (IV-1) and mixed completely to form a dye composition.

EXAMPLE 9

Preparing dyestuff of formula (I-1) and formula (IV-1) as described above. Take 60 parts of formula (I-1) and 40 parts of formula (IV-1) and mixed completely to form a dye composition.

COMPARATIVE EXAMPLE

The golden yellow dye product having high sale volume in the market and widely use is selected. Such as from the color index, dye serial number including C.I. reactive yellow dye No. 176, C.I. reactive orange dye No. 107, C.I. reactive yellow dye No. 84 or mixture of is used and referenced for comparison in the dye property testing of the present invention.

The dye composition ratio of comparative examples 1-3 are shown in the table 1 below:

TABLE 1

| Comparative examples | C.I. reactive yellow dye No. 176 | C.I. reactive orange dye No. 107 | C.I. reactive yellow dye No. 84 |
| --- | --- | --- | --- |
| Comparative Example 1 | 100 parts | — | — |
| Comparative Example 2 | 20 parts | 80 parts | — |
| Comparative Example 3 | — | — | 100 parts |

TEST EXAMPLE 1

Discoloring Test by Ghosting Under Exhaustion Dyeing

Each dye composition of comparative examples 1-3 and examples 1-9 of the present invention are tested by discoloring test to evaluate ghosting of single color and trichromatic color mixture of yellow, red and blue. The test procedures and results are as follow.

Test Procedure:

First dye liquors are prepared, wherein each 80 mL liquor respectively has a concentration of 0.5% on the weight of the fabric (o.w.f). After that inorganic neutral salt is added, and then dyeing of the un-mercerized cloths made of pure cotton is started. The un-mercerized cotton cloths are soaked in the dye liquors. At the same time, dyeing of the dyestuffs is started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths are water cleaned, soaping off, and tumbled-dried to form finish products.

Follow up a mesh printing screen of an area of 2"×4" is placed over the aforementioned finished dye cloth samples, and Solar White Plastisol S9027LB printing paste (manufactured by PolyOne Corp.) is applied on top and evenly printed with a stainless steel rod for a total of two runs (back and forth). The printing paste on top of the test samples are bake dried under 110° C.×60 seconds, and further heated to shape under elevated temperature of 163° C. (325° F.) for 60 seconds. The printing paste is left on top for it to fully react with the testing samples, after the samples are taken out to resurge for two hours. Next the samples are soaked in water, where the excess water is removed after while maintaining the samples with a humidity of 100%, after both the printed and unprinted samples are folded and placed in a sublimating fastness device under 120° C.×30 min, lastly with the use of AATCC EP1 the processed samples are proceeded with color distortion comparison.

Test Result:

The results of ghosting test by exhaustion dyeing are shown in the following table 2 and table 3.

TABLE 2

|  | 5% concentration dye liquors (o.w.f) grade level |
|---|---|
| Example 1 | 4-5 |
| Example 2 | 4-5 |
| Example 3 | 4-5 |
| Example 4 | 3-4 |
| Example 5 | 3-4 |
| Example 6 | 3-4 |
| Example 7 | 3-4 |
| Example 8 | 3-4 |
| Example 9 | 3-4 |
| Comparative Example 1 | 1 |
| Comparative Example 2 | 1 |
| Comparative Example 3 | 1 |

TABLE 3

| Trichromatic mixture composition of yellow, red and blue | 0.5% concentration dye liquors (o.w.f) |
|---|---|
| ◎ Example 1<br>◎ Everzol Red 3BS<br>◎ Everzol Blue BRF | 4-5 |
| ◎ Example 2<br>◎ Everzol Red 3BS<br>◎ Everzol Blue BRF | 4-5 |
| ◎ Example 3<br>◎ Everzol Red 3BS<br>◎ Everzol Blue BRF | 4-5 |
| ◎ Example 4<br>◎ Everzol Red 3BS<br>◎ Everzol Blue BRF | 3-4 |
| ◎ Example 5<br>◎ Everzol Red 3BS<br>◎ Everzol Blue BRF | 3-4 |
| ◎ Example 6<br>◎ Everzol Red 3BS<br>◎ Everzol Blue BRF | 3-4 |
| ◎ Example 7<br>◎ Everzol Red 3BS<br>◎ Everzol Blue BRF | 3-4 |
| ◎ Example 8<br>◎ Everzol Red 3BS<br>◎ Everzol Blue BRF | 3-4 |
| ◎ Example 9<br>◎ Everzol Red 3BS<br>◎ Everzol Blue BRF | 3-4 |
| ◎ C.I. reactive yellow dye No. 176<br>◎ Everzol Red 3BS<br>◎ Everzol Blue BRF | 1<br>(tend to red and blue) |

In the single color test, the composition of examples 1-9 invented here confirms the superiority over the present comparative examples 1-3.

The ghosting of the dyed products of the aforementioned examples 1-9, comparative examples 1-3 and the trichromatic mixture dye composition of yellow, red and blue are tested by discoloring test. Next, Datacolor Spectraflash-SF450 color spectrometer is used to examine the difference between the before and after dyeing strength and extend of discoloration, where the higher grade level with minimum changes are preferred. The dye compositions of examples 1-9 of the present invention demonstrate high level hue strength with minimum changes, such that they indicate the preferred ghosting fastness can go up to level 3 and above. Similarly, the trichromatic mixture of yellow, red and blue comprising the components of the dye compositions of examples 1-9 of the present invention demonstrates high level hue strength with minimum changes, such that they indicate the preferred ghosting fastness can go up to level 3 and above. From the above, the dye compositions of examples 1-9 of the present invention are superior with respect to other golden-yellow dyestuffs.

TEST EXAMPLE 2

Discoloring Test by Photochromic Under Exhaustion Dyeing

Each dye composition of comparative examples 1-3 and examples 1-9 of the present invention are tested by discoloring test to evaluate photochromic of single color and trichromatic color mixture of yellow, red and blue. The test procedures and results are as follow.

Test Procedure:

First dye liquors are prepared, wherein each 80 mL liquor respectively has a concentration of 0.5%. After that inorganic neutral salt is added, and then dyeing of the un-mercerized cloths made of pure cotton is started. The un-mercerized cotton cloths are soaked in the dye liquors. At the same time, dyeing of the dyestuffs is started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths are water cleaned, soaping off, and tumbled-dried to form finish products.

The aforementioned dye products are placed in a dark room for two hours, and then color test is carried out with the use of Datacolor Spectraflash-SF450 color spectrometer. Follow up exposure test is carried out, where dye products are placed under $D_{65}$ light source (Datacolor Tru-Vue~$D_{65}$) for two hours, and then color test is proceeded with Datacolor Spectraflash-SF450 color spectrometer, the discoloration of the before and after test is compared.

Test Result:

The results of photochromic by exhaustion dyeing are shown in the following table 4 and table 5.

TABLE 4

|  | 0.5% concentration dye liquors (o.w.f) |
|---|---|
| Example 1 | Good |
| Example 2 | Good |
| Example 3 | Good |
| Example 4 | Ordinary |
| Example 5 | Ordinary |
| Example 6 | Ordinary |
| Example 7 | Good |
| example 8 | Good |
| Example 9 | Good |
| Comparative Example 1 | Poor |
| Comparative Example 2 | Poor |
| Comparative Example 3 | Poor |

TABLE 5

| Trichromatic mixture composition of yellow, red and blue | 5% concentration dye liquors (o.w.f) |
|---|---|
| ⊚ Example 1<br>⊚ Everzol Red 3BS<br>⊚ Everzol Blue BRF | Good |
| ⊚ Example 2<br>⊚ Everzol Red 3BS<br>⊚ Everzol Blue BRF | Good |
| ⊚ Example 3<br>⊚ Everzol Red 3BS<br>⊚ Everzol Blue BRF | Good |
| ⊚ Example 4<br>⊚ Everzol Red 3BS<br>⊚ Everzol Blue BRF | Good |
| ⊚ Example 5<br>⊚ Everzol Red 3BS<br>⊚ Everzol Blue BRF | Good |
| ⊚ Example 6<br>⊚ Everzol Red 3BS<br>⊚ Everzol Blue BRF | Good |
| ⊚ Example 7<br>⊚ Everzol Red 3BS<br>⊚ Everzol Blue BRF | Good |
| ⊚ Example 8<br>⊚ Everzol Red 3BS<br>⊚ Everzol Blue BRF | Good |
| ⊚ Example 9<br>⊚ Everzol Red 3BS<br>⊚ Everzol Blue BRF | Good |
| ⊚ C.I. reactive yellow dye No. 176<br>⊚ Everzol Red 3BS<br>⊚ Everzol Blue BRF | Poor |

Level standard: based on the magnitude of ΔE, where it is preferred to have a low ΔE with minimal discoloration.

Good: ΔE<0.2

Ordinary: 0.2≦ΔE<0.4

Poor: 0.4≦ΔE

In the single color test, the composition of examples 1-9 invented here confirms the superiority over the present comparative examples 1-3.

The dye products of the aforementioned examples 1-9, comparative examples 1-3 and the trichromatic mixture dye composition of yellow, red and blue are tested by exposing under $D_{65}$ light. Next, Datacolor Spectraflash-SF450 color spectrometer is used to examine the discoloration extend between the before and after test, where it is preferred to have a low ΔE with minimal discoloration. The dye compositions of examples 1-9 of the present invention demonstrate low ΔE when exposed to $D_{65}$ light, such that they indicate minimal discoloration and good photochronmsm. Similarly, the trichromatic mixture of yellow, red and blue comprising the components of the dye compositions of examples 1-9 of the present invention demonstrates a ΔE below 0.2 when exposed to $D_{65}$ light, such that it indicates the dye composition of examples 1-9 of the present invention have low discoloration with minimal changes, and is preferred over other golden yellow dyestuffs.

The dye compositions of the present invention are general dye compositions suitable for dyeing cellulose fibers. They can be used to dye cellulose fibers with various dyeing methods, such as exhaustion dyeing, printed-dyeing, or continuous dyeing that are commonly used in the dyeing of reactive dyestuffs.

The dye compositions of the present invention are water-soluble dyestuffs that have a highly commercial value. The dye compositions of the present invention can obtain dyeing results with excellent properties in all aspects, especially in washing off, build-up, levelness, photochromism, ghosting fastness and light fastness.

From the foregoing description, regardless of the objects, the techniques, the effects or the skill aspects and developments, the present invention is distinctive with respect to known skills. Although the present invention has been explained in relation to its preferred embodiment, it is to be understood that many other possible modifications are variations can be made without departing from the scope of the invention as hereinafter claimed.

What is claimed is:

1. A dye composition comprising:
(a) a mono azo dye of the following formula (I) present in an amount ranging from 1% to 99% by weight relative to total weight of the composition,

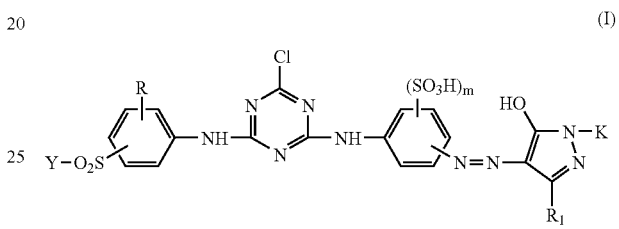

wherein

R is hydrogen, sulfo, $C_{1-4}$ alkyl or $C_{1-4}$ alkoxyl;

$R_1$ is —$CH_3$ or —COOH;

K is phenyl or naphthyl ring having 0 to 3 substituent groups, said substituent groups are selected from halogen, $C_{1-4}$ alkyl, $C_{1-4}$ alkoxyl, nitro, amino, hydroxyl, carboxyl, phosphonic acid, sulfo and —$SO_2$—Y;

Y is —CH=$CH_2$, —$CH_2CH_2Cl$ or —$CH_2CH_2OSO_3H$;

m is 2; and (b) at least one azo dye selected from the group consisting of the following formula (II), (III) and (IV) present in an amount ranging from 1% to 99% by weight relative to total weight of the composition,

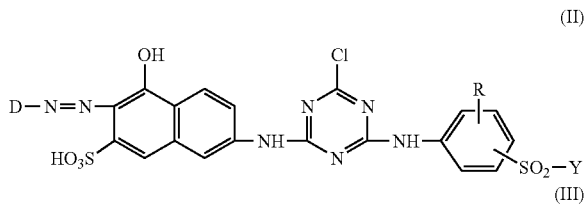

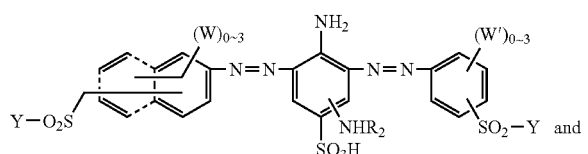

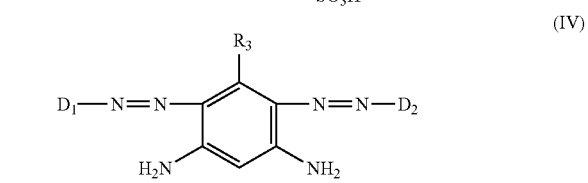

wherein
R is hydrogen, sulfo, $C_{1-4}$ alkyl or $C_{1-4}$ alkoxyl;
$R_2$ is hydrogen, $C_{1-4}$ alkyl sulfo or $C_{1-4}$ carboxylic acid;
$R_3$ is hydrogen or carboxyl;
Y is —CH=$CH_2$, —$CH_2CH_2Cl$ or —$CH_2CH_2OSO_3H$;
$(W)_{0-3}$ is 0 to 3 the same or different groups selected from the group consisting of sulfo, $C_{1-4}$ alkyl and $C_{1-4}$ alkoxyl;
$(W')_{0-3}$ is 0 to 3 the same or different groups selected from the group consisting of sulfo, $C_{1-4}$ alkyl and $C_{1-4}$ alkoxyl;
D is the following group

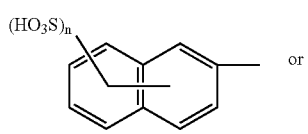

(Va)

or

-continued

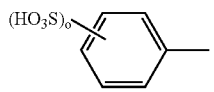

(Vb)

wherein
n is 1, 2 or 3;

o is 1 or 2; and $D_1$ and $D_2$ are independently of one another the following group of formula (VI):

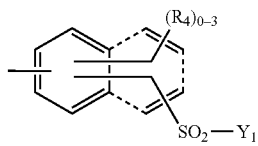

(VI)

wherein
$(R_4)_{0-3}$ is 0 to 3 the same or different groups selected from the group consisting of halogen, carboxyl, sulfo, $C_{1-4}$ alkyl and $C_{1-4}$ alkoxyl;
$Y_1$ is —CH=$CH_2$, —$CH_2CH_2Cl$ or —$CH_2CH_2OSO_3H$.

2. The dye composition of claim 1, wherein said component (a) is present in an amount ranging from 95% to 5% by weight relative to total weight of the composition, said component (b) is present in an amount ranging from 5% to 95% by weight relative to total weight of the composition.

3. The dye composition of claim 1, wherein formula (I) is the compound of formula (Ia):

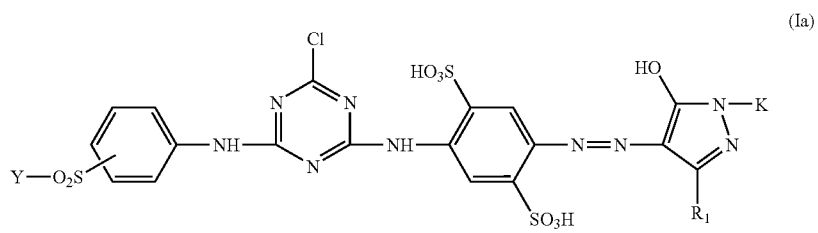

wherein $R_1$ is —$CH_3$ or —COOH;

K is phenyl or naphthyl ring having 0 to 3 substituent groups, said substituent groups are selected from halogen, $C_{1-4}$ alkyl, $C_{1-4}$ alkoxyl, nitro, amino, hydroxyl, carboxyl, phosphonic acid, sulfo and —$SO_2$—Y;

Y is —CH=$CH_2$, —$CH_2CH_2Cl$ or —$CH_2CH_2OSO_3H$.

4. The dye composition of claim 1, wherein formula (II) is the compound of formula (IIa):

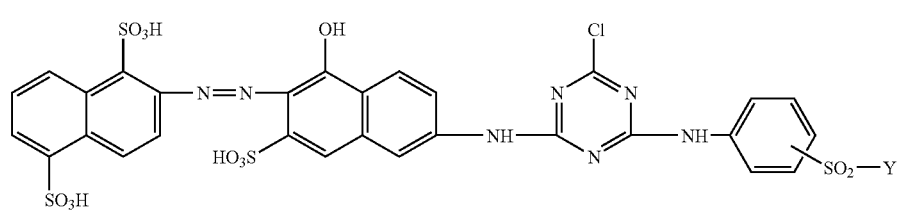

wherein
Y is —CH=$CH_2$, —$CH_2CH_2Cl$ or —$CH_2CH_2OSO_3H$.

5. The dye composition of claim 1, wherein formula (III) is the compound of formula (IIIa):

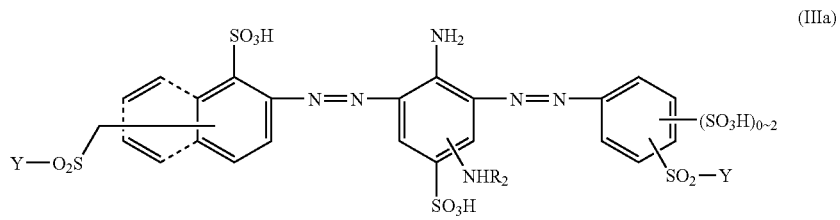

(IIIa)

wherein
$R_2$ is hydrogen, $C_{1-4}$ alkyl sulfo or $C_{1-4}$ carboxylic acid;
Y is $-CH=CH_2$, $-CH_2CH_2Cl$ or $-CH_2CH_2OSO_3H$.

6. The dye composition of claim 1, wherein formula (IV) is the compound of formula (IVa):

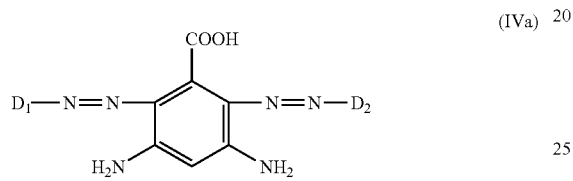

(IVa)

wherein
$D_1$ and $D_2$ are independently of one another the following group of formula (VI)

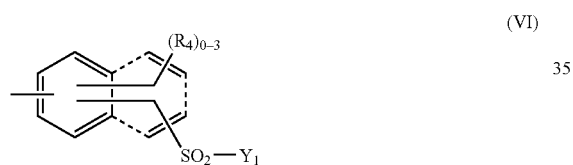

(VI)

wherein $(R_4)_{0-3}$ is 0 to 3 the same or different groups selected from the group consisting of halogen, carboxyl, sulfo, $C_{1-4}$ alkyl and $C_{1-4}$ alkoxyl;
$Y_1$ is $-CH=CH_2$, $-CH_2CH_2Cl$ or $-CH_2CH_2OSO_3H$.

7. The dye composition of claim 1, wherein formula (I) is the compound of formula (Ib):

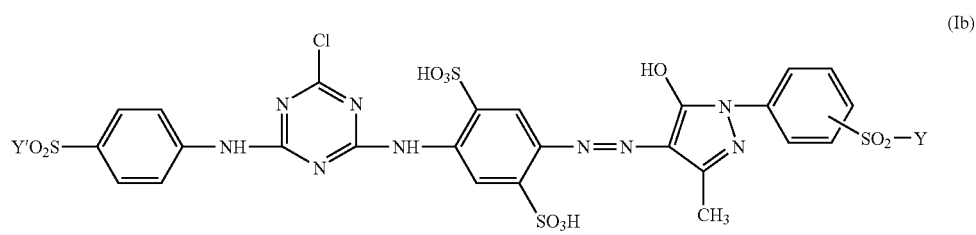

(Ib)

wherein
Y is $-CH=CH_2$, $-CH_2CH_2Cl$ or $-CH_2CH_2OSO_3H$;
Y' is $-CH=CH_2$ or $-CH_2CH_2OSO_3H$.

8. The dye composition of claim 1, wherein formula (II) is the compound of formula (IIb):

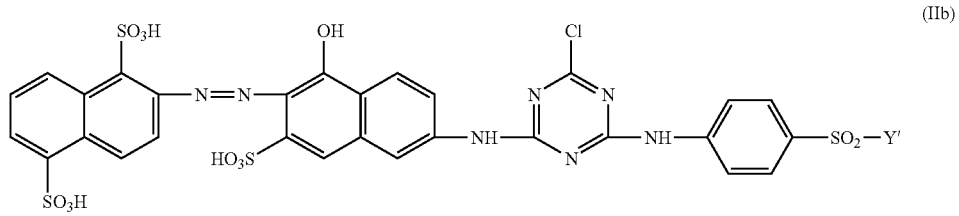

wherein
Y' is —CH=CH$_2$ or —CH$_2$CH$_2$OSO$_3$H.

9. The dye composition of claim 1, wherein formula (III) is the compound of formula (IIIb):

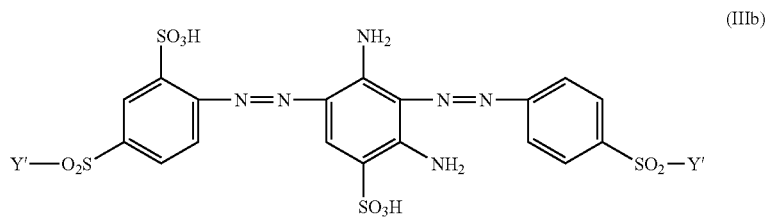

wherein
Y' is —CH=CH$_2$ or —CH$_2$CH$_2$OSO$_3$H.

10. The dye composition of claim 1, wherein formula (IV) is the compound of formula (IVb):

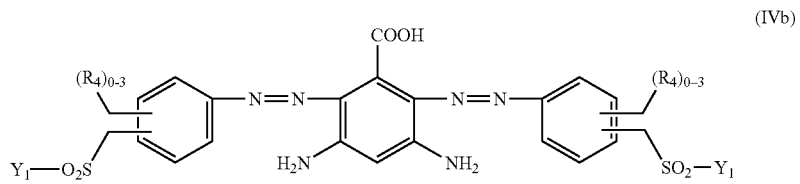

wherein
(R$_4$)$_{0-3}$ is 0 to 3 the same or different groups selected from the group consisting of halogen, carboxyl, sulfo, C$_{1-4}$ alkyl and C$_{1-4}$ alkoxyl;
Y$_1$ is —CH=CH$_2$, —CH$_2$CH$_2$Cl or —CH$_2$CH$_2$OSO$_3$H.

11. The dye composition of claim 7, wherein formula (Ib) is the compound of formula (I-1):

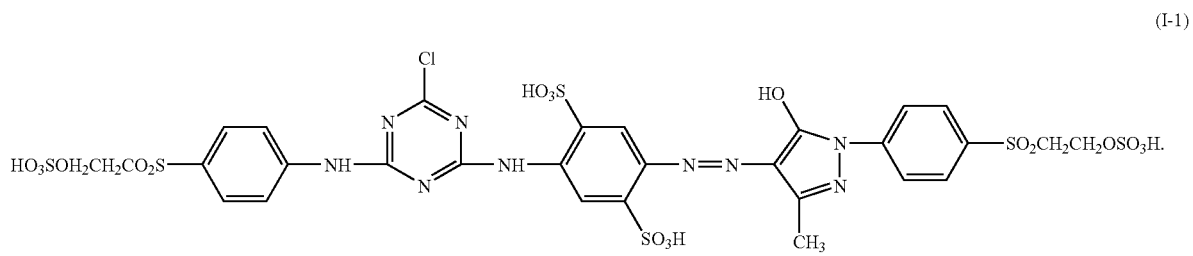

12. The dye composition of claim 8, wherein formula (IIb) is the compound of formula (II-1):

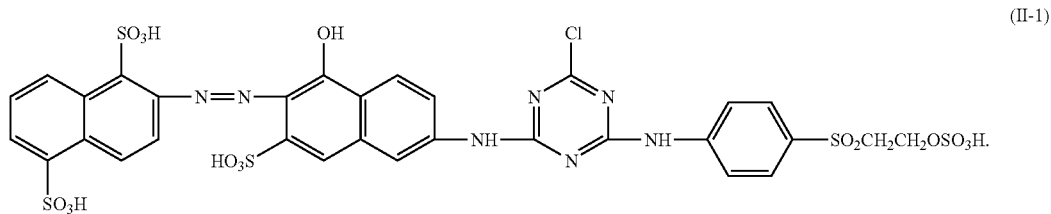

(II-1)

13. The dye composition of claim 9, wherein formula (IIIb) is the compound of formula (III-1):

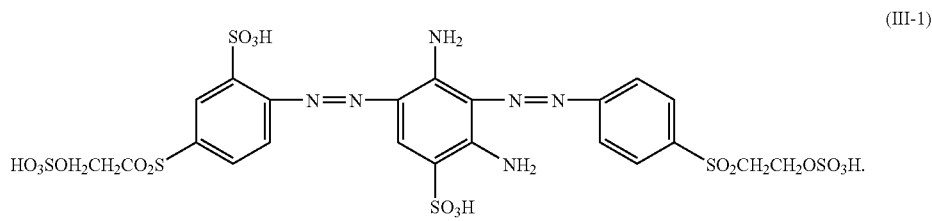

(III-1)

14. The dye composition of claim 10, wherein formula (IVb) is the compound of formula (IV-1):

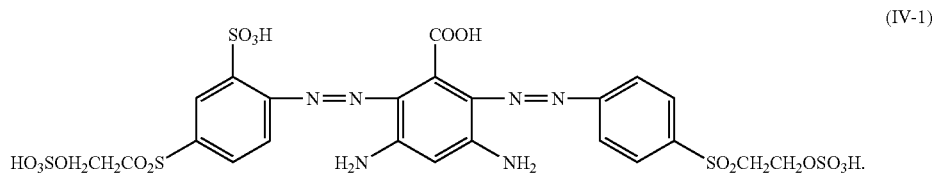

(IV-1)

15. The dye composition according to claim 1, wherein the (a) mono azo dye is present in an amount ranging from 95% to 5% by weight relative to total weight of the composition, said (b) at least one azo dye is present in an amount ranging from 5% to 95% by weight relative to total weight of the composition; and wherein said (b) at least one azo dye is a compound of formula (II)

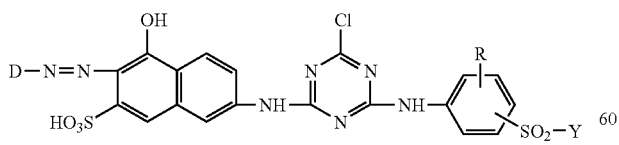

(II)

wherein

R is hydrogen, sulfo, $C_{1-4}$ alkyl or $C_{1-4}$ alkoxyl;

Y is —CH=$CH_2$, —$CH_2CH_2$Cl or —$CH_2CH_2OSO_3H$; and

D is the following group

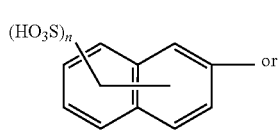

16. The dye composition according to claim 1, wherein the (a) mono azo dye is present in an amount ranging from 95% to 5% by weight relative to total weight of the composition, said (b) at least one azo dye is present in an amount ranging from 5% to 95% by weight relative to total weight of the composition; and wherein said (b) at least one azo dye is a compound of formula (III):

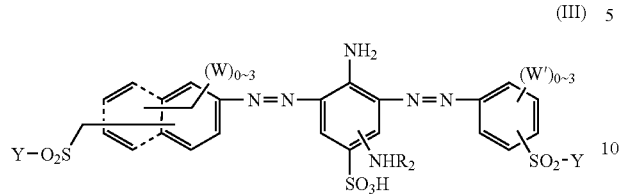
(III)

wherein
R₂ is hydrogen, $C_{1-4}$ alkyl sulfo or $C_{1-4}$ carboxylic acid;
R₃ is hydrogen or carboxyl;
Y is —CH=CH₂, —CH₂CH₂Cl or —CH₂CH₂OSO₃H;
(W)₀₋₃ is 0 to 3 the same or different groups selected from the group consisting of sulfo, $C_{1-4}$ alkyl and $C_{1-4}$ alkoxyl;
(W')₀₋₃ is 0 to 3 the same or different groups selected from the group consisting of sulfo, $C_{1-4}$ alkyl and $C_{1-4}$ alkoxyl;
n is 1, 2 or 3; and
o is 1 or 2.

17. The dye composition according to claim 1, wherein the (a) mono azo dye is present in an amount ranging from 95% to 5% by weight relative to total weight of the composition, said (b) at least one azo dye is present in an amount ranging from 5% to 95% by weight relative to total weight of the composition; and
wherein said (b) at least one azo dye is a compound of formula (IV):

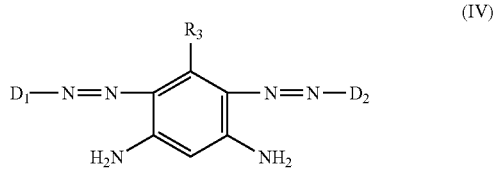
(IV)

wherein
R₃ is hydrogen or carboxyl; and D is the following group

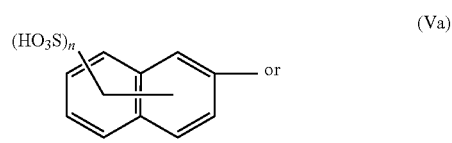
(Va)

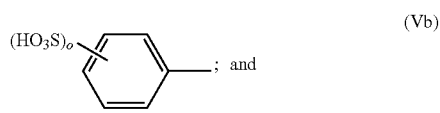
(Vb)
; and

D₁ and D₂ are independently of one another the following group of formula (VI)

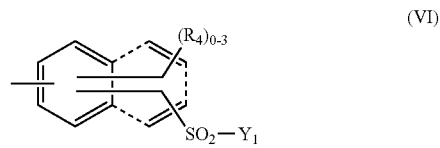
(VI)

wherein
(R₄)₀₋₃ is 0 to 3 the same or different groups selected from the group consisting of halogen, carboxyl, sulfo, $C_{1-4}$ alkyl and $C_{1-4}$ alkoxyl;
Y₁ is —CH=CH₂, —CH₂CH₂Cl or —CH₂CH₂OSO₃H.

18. The dye composition of claim 11, wherein the (b) at least one azo dye is the compound of formula (II-1):

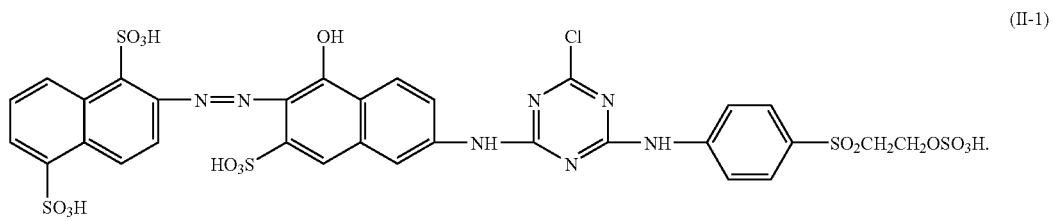
(II-1)

19. The dye composition of claim 11, wherein the (b) at least one azo dye is the compound of formula (III-1):
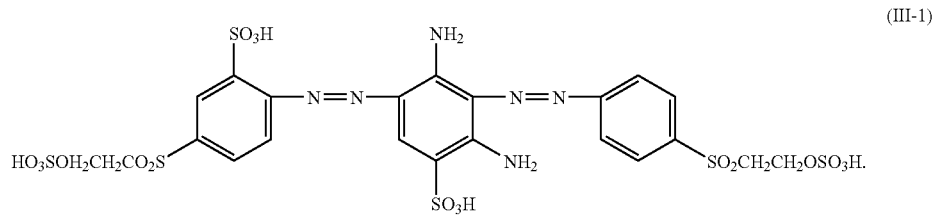
(III-1)
20. The dye composition of claim 11, wherein the (b) at least one azo dye is the compound of formula (IV-1):
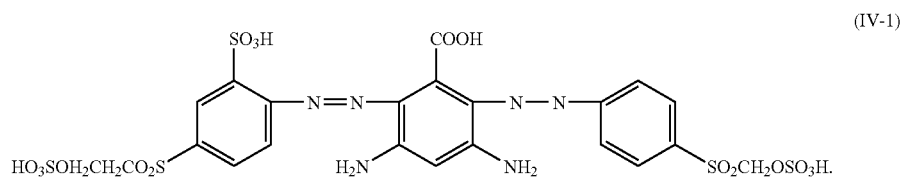
(IV-1)
\* \* \* \* \*